R. B. BAKER.
INSULATOR FOR TELEGRAPH WIRES.

No. 103,122. Patented May 17, 1870.

WITNESSES,
Wm A. Steel.
Jno. B. Harding.

Robert B. Baker
by his Atty.
Howson and Son

United States Patent Office.

ROBERT BRECKENRIDGE BAKER, OF PHILADELPHIA, PENNSYLVANIA.

Letters Patent No. 103,122, dated May 17, 1870.

IMPROVEMENT IN INSULATORS FOR TELEGRAPHIC WIRE.

The Schedule referred to in these Letters Patent and making part of the same.

I, ROBERT BRECKENRIDGE BAKER, of Philadelphia, county of Philadelphia, State of Pennsylvania, have invented an Improvement in Insulators for Telegraph Wires, of which the following is a specification.

Nature and Object of the Invention.

My invention consists in the combination with, or application to, telegraphic wires, of metallic oxide as an insulating medium.

Description of the Accompanying Drawing.

Figure 1:
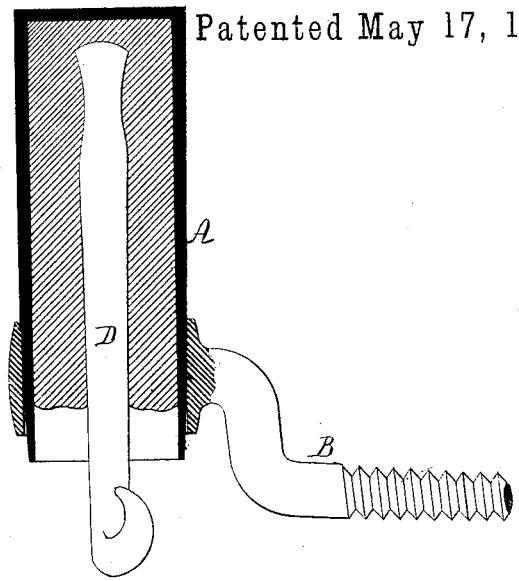
Figure 2:
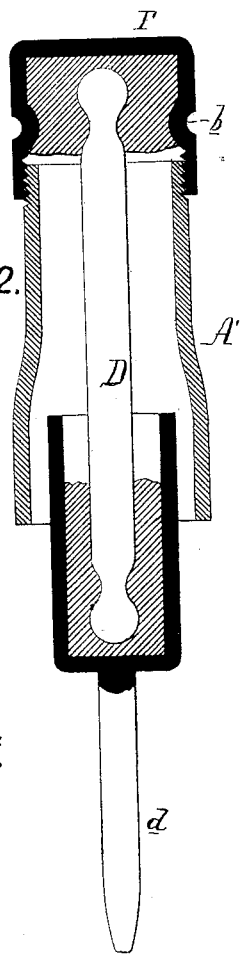

Figure 1 represents a vertical section of an insulated wire-holder, to illustrate one mode of carrying out my invention; and Figure 2 a section of another insulated wire-holder, illustrating another mode of carrying out my invention.

General Description.

I have discovered that metallic oxides, which have heretofore been looked upon as conductors of electricity, are actually the most effective non-conductors.

My invention of applying metallic oxides to the insulation of telegraphic wires may be carried into effect in a variety of ways, but I have not deemed it necessary to illustrate more than two such applications.

The wire-holder shown in fig. 1 consists of an inverted cup, A, of cast-iron, fitted to an eye in a screw-rod, B, by which the insulator may be connected to a pole, the cup A containing the suspension-rod D, the double hook at the lower end of which supports the telegraph-wire.

Wire-holders of this class have long been in common use, but their rods D have been heretofore confined to the cups A by sulphur, as a non-conducting medium, glass being sometimes used in conjunction with the sulphur, and sometimes paraffine, or both glass and paraffine being used as insulating mediums.

My insulating medium is a metallic oxide, red lead, for instance, which, when applied as shown in fig. 1, I mix with sulphur, the proportions of the sulphur and oxide being about equal.

The sulphur is melted and the oxide thoroughly mixed with it, and the composition, while in a semi-fluid state, is poured into the open end of the cup A, while the latter is in a position the reverse of that shown, while the suspension-rod D is held within the cup.

After the composition becomes thoroughly hard, the rod D will be firmly held in its place, and the holder effectually insulated and ready for use.

In the modified wire-holder, shown in fig. 2, the stem $d$ is fitted in the arm of a telegraph-pole, and the telegraph-wire is coiled in the groove $b$ of the cap F, which is screwed onto the casing A'. Further description of this modification will be unnecessary, as telegraph-holders of this class are well known.

Any of the metallic oxides, oxide of iron or oxide of zinc, for instance, may be used in place of red lead; and other solidifying substances, asphaltum, for instance, may be used in place of sulphur or textile material.

Although I have selected two styles of wire-holders with the view of illustrating modes of carrying my invention into effect, it should be distinctly understood that my invention may be applied to any of the wire-holders in use, my invention being, in fact, the application of metallic oxide as an insulating substance to any wire or wire-holder, whether the oxide be used in conjunction with any suitable material or substance simply as a medium of increasing the insulating properties of any wire-holders, or as an ingredient by which the suspension wires are retained, in the manner described above.

Those familiar with the construction of wire-holders can readily understand, without further explanation, how metallic oxides can be generally applied in a variety of ways to the insulating of all wire-holders, or to underground retainers of wires.

Claim.

The combination with, or application to, telegraph-wires, of metallic oxide as an insulating medium.

In testimony whereof I have signed my name to this specification in the presence of two subscribing witnesses.

ROBERT BRECKENRIDGE BAKER.

Witnesses:
 FRANK B. RICHARDS,
 HARRY SMITH.